Sept. 30, 1969   G. A. MEDSKER   3,469,304

FLUXED GAS FOR RESISTANCE AND INDUCTION WELDING AND BRAZING

Filed Dec. 28, 1966

INVENTOR.
GEORGE A. MEDSKER
BY
*Eber J. Hyde*
ATTORNEY

United States Patent Office 3,469,304
Patented Sept. 30, 1969

3,469,304
FLUXED GAS FOR RESISTANCE AND INDUCTION WELDING AND BRAZING
George A. Medsker, Elyria, Ohio, assignor to The Gasflux Company, a corporation of Ohio
Filed Dec. 28, 1966, Ser. No. 605,398
Int. Cl. B23k 31/02
U.S. Cl. 29—494                4 Claims

ABSTRACT OF THE DISCLOSURE

The present invention pertains to the field of resistance and induction welding and brazing using a non-combustible carrier gas wherein flux vapor is incorporated to carry the flux vapor to the work zone to facilitate and improve the weld or braze. This invention is not applicable to arc welding processes. It is applicable to the joining or fusing of two parent metals in which, if a third metal is used to facilitate the joining, it has a lower melting temperature than either of the two parent metals.

Background of the invention

In the past flux vapor has been mixed with fuel gas for use with brazing torches and the like; see U.S. Patent 3,148,723, issued on Sept. 15, 1964, to Thomas J. Farquhar. Also, as is well known, induction welding has used an inert protective atmosphere at the work area; see U.S. Patent 2,919,335. Gas shielded induction fusion welding is known; see U.S. Patent 2,528,758.

In many resistance welding and brazing operations there are apt to be parts adjacent the parts to be welded or brazed which should not be oxidized by the heat generated at the weld or braze. For example, steel and brass wire brushes are assembled by welding together into a loop the ends of a twisted-together steel wire core, the twisted-together core holding the bristles which form the brush. Ordinary resistance welding brings the temperature of the ends of the wire core to about 2500° F., at which point the ends are pressed together to cause fusion of the ends. Due to the high temperature and due to the fact that the joint was unprotected at the high temperature, the resulting joint is brittle and the steel or brass bristles adjacent the joint are oxidized.

Summary of invention

The present invention provides a system and method wherein a non-combustible gas is utilized to pick up flux vapor and carry the flux vapor to the hot work zone to protect the work pieces and the area adjacent thereto while the area is at high temperature during the welding or brazing operation. Wire brushes assembled in accordance with this invention exhibited clean, ductile core joints and no oxidation of the fine wires which constitute the brush.

Figure 1:
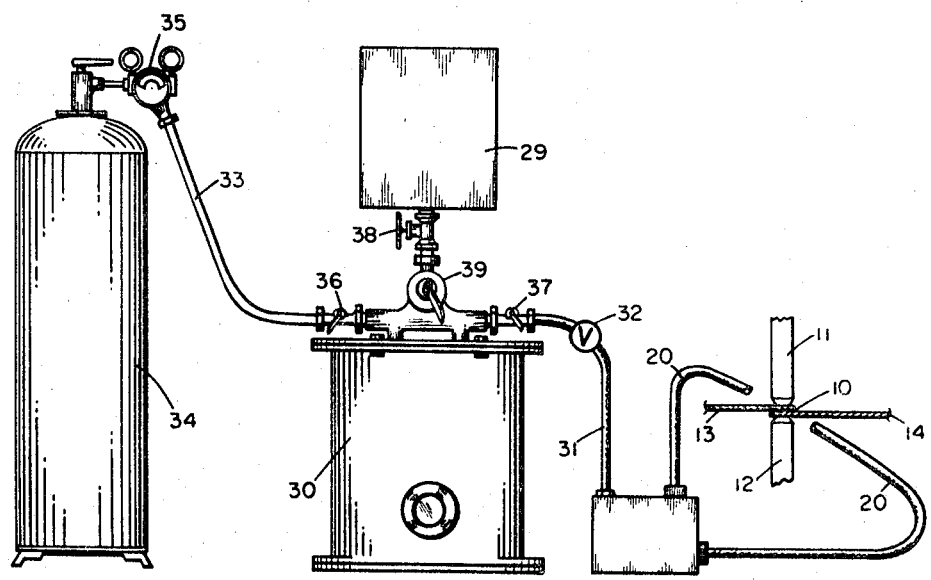
Figure 2:
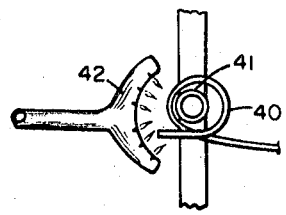

With reference to the drawing there is shown in FIGURE 1 a system for supplying fluxed atmosphere for a resistance welded joint, and FIGURE 2 shows a typical set-up for induction welding a joint.

With reference to FIGURE 1 of the drawing there is shown a typical lap joint 10 to be resistance welded, copper electrodes 11, 12 being located on either side of the lapped members 13, 14 for carrying electric current to the joint and for applying pressure thereto to effect fusion of the joint where the proper temperature has been achieved, as is known in the art. Adjacent the lapped members 13, 14 and the electrodes 11, 12 are one or more nozzles 20 which envelope the work zone with a protective atmosphere which includes flux vapor to improve the joint which results from the welding operation. For best results, the work area should remain shrouded in the protective, fluxed atmosphere until the joint has cooled its oxidation range.

The fluxed, protective atmosphere vapor is fed to the nozzles 20 from a mixer 30 by way of hose 31 having a solenoid valve 32 therein for use in an automated set-up. The mixer 30 may be of the type shown in Patent 3,148,723 wherein a flux supply container 29 is suitably connected thereto by means of appropriate pipes and control valves. Connected to the mixer 30 by means of hose 33 is a tank 34 which may contain non-combustible inert gas such as argon, helium, or nitrogen, depending on the job to be done, or which may contain non-combustible $CO_2$ or even compressed air. A pressure regulator and/or a flow meter 35 may be located between the tank 34 and the mixer 30, and suitable shut-off or throttle valve 36, 37, 38 may be included in the system.

The supply of flux located in the container 29 periodically is connected to the mixer 30 to provide the mixer with its own supply, and normally during operation the valves 38, 39 are closed. The flux may be of the type shown, described and claimed in Charles A. Medsker's Patent 2,908,599, or other fluxes may be used depending upon the work to be brazed or resistance welded. The mixer 30 adds flux vapor to the non-combustible gas obtained from the tank 34, and the fluxed gas is carried to the hot work zone of the welding or brazing set-up. Methyl borate is the preferred flux, and it may be added in the vapor form to the noncombustible gas. The methyl borate vapor has a boron content of about 7 to 8% by weight in the azeotrope form, and this may be blended down to about 2% by the addition of hexane, methanol, or acetone. In the art, the term "methyl borate" often means the trimethyl borate azeotrope. Trimethyl borate, pure, is $(CH_3O)_3B$ and the azeotrope is 70% $(CH_3O)_3B$–30% MeOH. At the hot work zone the methanol burns off, leaving boron flux on the hot piece to be welded. The methyl borate gas flux, even though carried to the hot work zone by $CO_2$ or air, provides a protective atmosphere at and around the immediate area to be welded or brazed. $CO_2$ is cold and will not pick up as much methyl borate in the mixer as will the inert gasses and air, but it is entirely suitable for some operations. The resistance welding operations may be carried on at temperatures between about 1100° F. and 2500° F., and the induction welding or brazing operations may be carried on at temperatures between about 1125° F. and 1800° F., depending upon the materials to be connected together and depending upon the brazing material being used. At the higher temperatures it usually is preferred to use an inert gas such as argon, helium or nitrogen as the carrier for the flux vapor, as added protection is obtained by shrouding the entire work area with the inert gas.

FIGURE 2 shows a nozzle set-up for an electrical induction heating system, wherein the electrical induction coil is identified by reference character 40. The work to be joined is schematically shown at 41, and a segment of a ring nozzle 42 may be used to flood the hot zone with gas carrying the methyl borate flux to the parts to be joined.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:
1. The method of joining together at least two pieces of metal which comprises the steps of heating said at least two pieces to an elevated temperature sufficient to soften the said at least two pieces, and carrying to the heated zone in a non-combustible gas flux vapor of methyl borate, whereby the combustible portion of said methyl borate is burned away at the heated zone leaving boron on the pieces to flux the connection, and thereafter cooling the pieces.

2. The method of connecting together at least two metal pieces, which comprises heating the said at least two pieces of metal to a temperature which softens at least one of them while said pieces are in virtual contact with each other, flooding the zone of said hot metal pieces with non-combustible gas carrying combustible methyl borate to cause the combustible portion of said methyl borate to burn away, leaving boron at the connection, and thereafter cooling the connection.

3. The method as set forth in claim 2, further characterized by said non-combustible gas being selected from the group consisting of air, carbon dioxide, argon, helium, and nitrogen.

4. The method as set forth in claim 3, further characterized by said gas carrying methyl borate vapor having a boron content in an amount between about 2–8% by weight of the azeotrope form.

References Cited

UNITED STATES PATENTS

| | | | |
|---|---|---|---|
| 2,262,187 | 11/1941 | Lytle | 29—494 X |
| 2,528,758 | 11/1950 | King | 219—9.5 |
| 2,714,760 | 8/1955 | Boam | 29—196 |
| 2,774,136 | 12/1956 | Schechter | 29—494 |
| 2,800,711 | 7/1957 | Oliphant | 29—495 X |
| 2,908,599 | 10/1959 | Medsker | 148—23 |
| 2,919,335 | 12/1959 | Shaughnessy | 219—9 |
| 3,148,723 | 9/1964 | Farquhar | 29—495 X |
| 3,210,840 | 10/1965 | Ulam | 29—488 |
| 3,378,914 | 4/1968 | Miller | 29—494 |

JOHN F. CAMPBELL, Primary Examiner

RICHARD B. LAZARUS, Assistant Examiner

U.S. Cl. X.R.

29—495